US008072392B2

(12) United States Patent
Lection

(10) Patent No.: US 8,072,392 B2
(45) Date of Patent: Dec. 6, 2011

(54) INTEGRATED DISPLAY SYSTEM FOR A COMPUTER AND A PORTABLE DEVICE

(75) Inventor: David B. Lection, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 900 days.

(21) Appl. No.: 11/952,412

(22) Filed: Dec. 7, 2007

(65) Prior Publication Data

US 2009/0146909 A1   Jun. 11, 2009

(51) Int. Cl.
*G09G 5/00* (2006.01)
*G06F 1/16* (2006.01)
*H05K 7/16* (2006.01)

(52) U.S. Cl. ........ 345/1.1; 345/4; 345/156; 361/679.04; 361/727

(58) Field of Classification Search ............ 345/1.1–1.2, 345/2.1–3.1, 4–6, 30, 55, 76–80, 84; 361/679.04, 361/679.29, 724–727
See application file for complete search history.

(56) References Cited

U.S. PATENT DOCUMENTS

| | | | |
|---|---|---|---|
| 6,489,932 B1 * | 12/2002 | Chitturi et al. ................... | 345/30 |
| 6,744,623 B2 | 6/2004 | Numano et al. | |
| 6,757,551 B2 | 6/2004 | Newman et al. | |
| 6,919,864 B1 * | 7/2005 | Macor ........................... | 345/1.1 |
| 6,967,665 B2 | 11/2005 | Ishikawa et al. | |
| 7,139,529 B2 | 11/2006 | Rekimoto et al. | |
| 7,221,331 B2 | 5/2007 | Bear et al. | |
| 2003/0103088 A1 * | 6/2003 | Dresti et al. .................. | 345/835 |
| 2003/0176214 A1 | 9/2003 | Burak et al. | |
| 2004/0192430 A1 | 9/2004 | Burak et al. | |
| 2004/0223061 A1 * | 11/2004 | Bear et al. ................ | 348/207.99 |
| 2006/0007051 A1 * | 1/2006 | Bear et al. ...................... | 345/1.1 |
| 2006/0048286 A1 | 3/2006 | Donato | |
| 2006/0238439 A1 | 10/2006 | Fuller et al. | |
| 2006/0238497 A1 * | 10/2006 | Velagapudi .................. | 345/156 |
| 2007/0010289 A1 | 1/2007 | Mezue | |

* cited by examiner

*Primary Examiner* — Lun-Yi Lao
*Assistant Examiner* — Jarurat Suteerawongsa

(57) ABSTRACT

A display-based device includes a display assembly having a first viewing portion and a second viewing portion within the first viewing portion and a docking station that removably docks a portable device having an imaging apparatus that includes a display apparatus and/or an image capture apparatus. When docked, the portable device's imaging apparatus is positioned facing a rear side of the second viewing portion. The display-based device operates in a first mode, where data from the display-based device is displayed in the second viewing portion and backlighting for the second viewing portion is provided by the portable device, and operates in a second mode, where the second viewing portion is substantially transparent so that the display apparatus of the portable device can display data through the second viewing portion and/or the image capture apparatus can capture images through the second viewing portion.

24 Claims, 7 Drawing Sheets

INTEGRATED DISPLAY SYSTEM FOR A COMPUTER AND A PORTABLE DEVICE

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

Current computer display systems allow for having both a primary and auxiliary display but do not provide for the auxiliary display and the primary display to share a common viewing portion of the primary display for displaying data and/or capturing images.

SUMMARY

A display-based host device and methods and computer program products for operating the display-based host device are described. In one aspect, the display-based device includes a display assembly having a first viewing portion and a second viewing portion within the first viewing portion and a docking station configured for removably docking a portable device having an imaging apparatus that includes at least one of a display apparatus and an image capture apparatus. When the portable device is docked, the imaging apparatus is positioned facing a rear side of the second viewing portion of the display assembly. The display-based device includes a display mode processor component configured for operating the display-based device in a first mode in which data from the display-based device is displayed in the second viewing portion and backlighting for the second viewing portion of the display assembly is provided by the portable device, and for operating the display-based device in a second mode in which the second viewing portion is substantially transparent so as to allow at least one of the display apparatus of the portable device to display data viewable through the display assembly in the second viewing portion, and the image capture apparatus to capture images through the second viewing portion.

In another aspect of the subject matter disclosed herein, a method is described for operating a display-based host device comprising a display assembly having a first viewing portion and a second viewing portion within the first viewing portion. The method includes providing for removably docking a portable device having an imaging apparatus that includes at least one of a display apparatus and an image capture apparatus, such that when the portable device is docked, the imaging apparatus is positioned facing a rear side of the second viewing portion of the display assembly. The method also includes operating the display-based device in a first mode in which data from the display-based device is displayed in the second viewing portion and backlighting for the second viewing portion of the display assembly is provided by the portable device, and operating the display-based device in a second mode in which the second viewing portion is substantially transparent so as to allow at least one of the display apparatus of the portable device to display data viewable through the display assembly in the second viewing portion, and the image capture apparatus to capture images through the second viewing portion.

In another aspect of the subject matter disclosed herein, a display-based host device has a display assembly including a first viewing portion and a second viewing portion within the first viewing portion and means for removably docking a portable device having an imaging apparatus that includes at least one of a display apparatus and an image capture apparatus, such that when the portable device is docked, the imaging apparatus is positioned facing a rear side of the second viewing portion of the display assembly. The display-based device also includes means for operating the display-based device in a first mode in which data from the display-based device is displayed in the second viewing portion and backlighting for the second viewing portion of the display assembly is provided by the portable device, and for operating the host device in a second mode in which the second viewing portion is substantially transparent so as to allow at least one of the display apparatus of the portable device to display data viewable through the display assembly in the second viewing portion, and the image capture apparatus to capture images through the second viewing portion.

In another aspect of the subject matter disclosed herein, a computer readable medium embodying a computer program, executable by a machine, is described for operating a display-based host device comprising a display assembly when a portable device having an imaging apparatus that includes at least one of a display apparatus and an image capture apparatus is removably docked to the display-based device, wherein the display assembly includes a first viewing portion and a second viewing portion within the first viewing portion and when the portable device is docked, the imaging apparatus is positioned facing a rear side of the second viewing portion of the display assembly. The computer program includes instructions for operating the host device in a first mode in which data from the host device is displayed in the second viewing portion and backlighting for the second viewing portion of the display assembly is provided by the portable device, and for operating the host device in a second mode in which the second viewing portion is substantially transparent so as to allow at least one of the display apparatus of the portable device to display data viewable through the display assembly in the second viewing portion, and the image capture apparatus to capture images through the second viewing portion.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Figure 1:
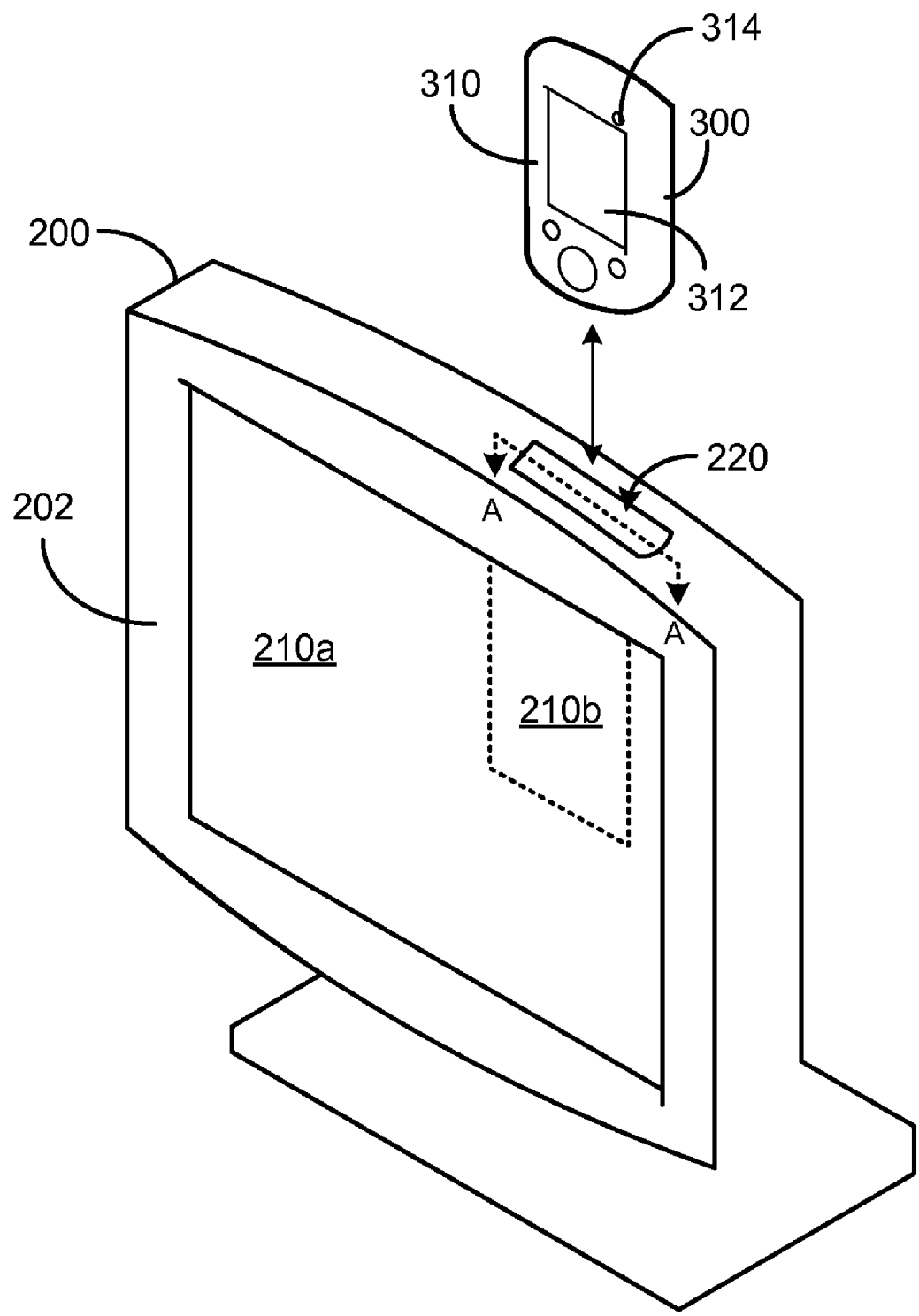
FIG. 1 is a diagram illustrating an exemplary display-based host device and an exemplary portable device according to an exemplary embodiment.

A display-based host device and methods and computer program products for operating the display-based host device are described. According to one embodiment, shown in FIG. 1, a display-based host device 200 includes a display assembly 202 that comprises a first viewing portion 210a and a second viewing portion 210b within the first viewing portion 210a. The display-based host device 200 can be any device that includes a display assembly 202. For example, the host device 200 can be a desktop computer, a mobile computer, a tablet computer, a portable DVD player and a portable gaming system. The display assembly 202, in one embodiment, can be a liquid crystal (LCD) display.

In one embodiment, the LCD panel 202 of the host device 200 has two layers. The first layer is an LCD panel that is made up of any number of color or monochrome pixels arrayed in front of a light source or reflector. The second layer behind the first layer is a backlight panel. A backlight is the form of illumination used in an LCD display panel. A backlight can be used in small displays to increase readability in low light conditions, and in computer displays and LCD televisions to produce light in a manner similar to a CRT display.

According to one embodiment, the second viewing portion 210b includes an addressable area of display pixels as part of the display assembly 202, but does not include a backlight panel. Accordingly, when the pixels in the second viewing portion 210b of display assembly 202 are turned off, the pixels become transparent and anything that is placed behind the LCD panel in the second viewing portion 210b is viewable.

In one embodiment, the display-based host device 200 also includes a docking station component 220 that is configured to receive a portable device 300 having an imaging apparatus 310. According to an exemplary embodiment, the imaging apparatus 310 is configured to capture and/or display information. For example, the imaging apparatus 310, in one embodiment, can include a display apparatus 312 for providing a user interface, and for displaying images and/or multimedia content. In this embodiment, the display apparatus 312 can include a backlit LCD panel that can illuminate a phone user interface. Alternatively or additionally, the imaging apparatus 310 can include an image capture apparatus 314 for capturing images. The portable device 300 can be any device having a smaller form factor than the display assembly 202, such as a mobile phone, camera phone, digital camera, or gaming system.

As stated above, the docking station component 220 of the display-based host device 200 is configured for receiving the portable device 300. According to an exemplary embodiment, the second viewing portion 210b of the display assembly 202 is positioned such that when the portable device 300 is in the docking station component 220, the imaging apparatus 310 of the portable device 300 substantially overlaps the second viewing portion 210b of the display assembly 202.

When the host device 200 and the portable device 300 are coupled in this configuration, many benefits can be realized. For example, the portable device 300 can provide alternative displays of content, and can provide backlighting of the second viewing portion 210b of the display assembly 202. In addition, the host device 200 can inherit resources and communications paths from the portable device 300. In another example, content displays from both the portable device 300 and the host device 200 can be combined to produce a composite image or animation. Moreover, the portable device 300 can be used to highlight important content displayed on the first viewing portion 210a of the display assembly 202 by modulating the illumination color and/or intensity of the backlight used to illuminate the second viewing portion 210b of the display assembly 202. Other advantages would be evident to those skilled in the art and are not limited to those described above.

Figure 2A:
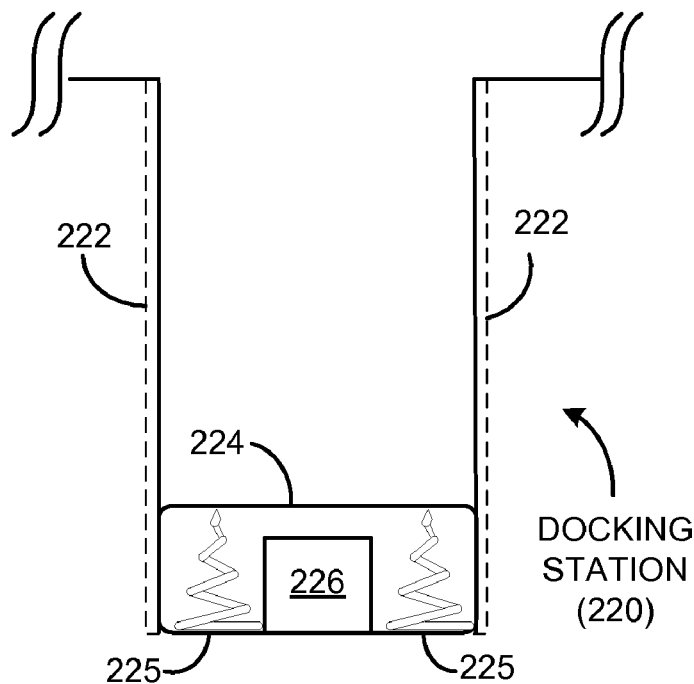
FIG. 2A is a cross-sectional view of an exemplary docking station in the display-based host device according to an exemplary embodiment.
Figure 2B:
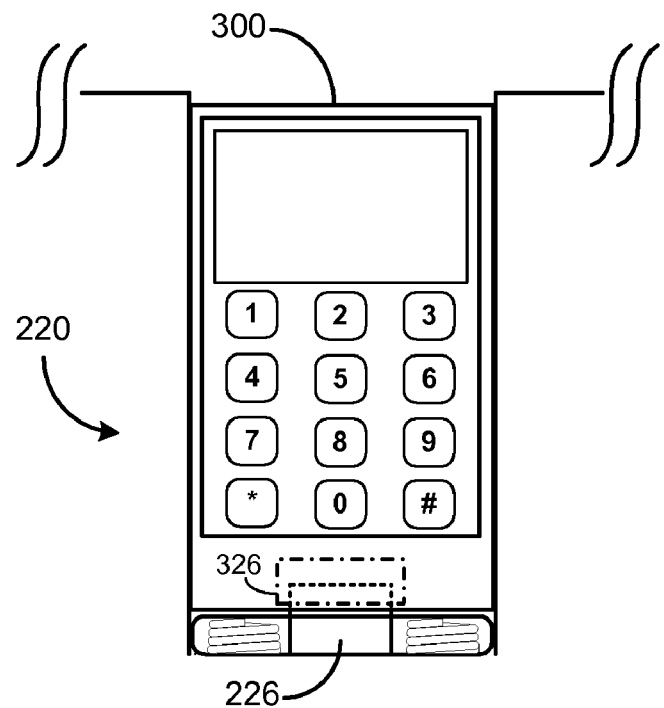
FIG. 2B is a cross-sectional view of an exemplary portable device docked in the exemplary docking station in the display-based host device according to an exemplary embodiment.
Figure 3A:
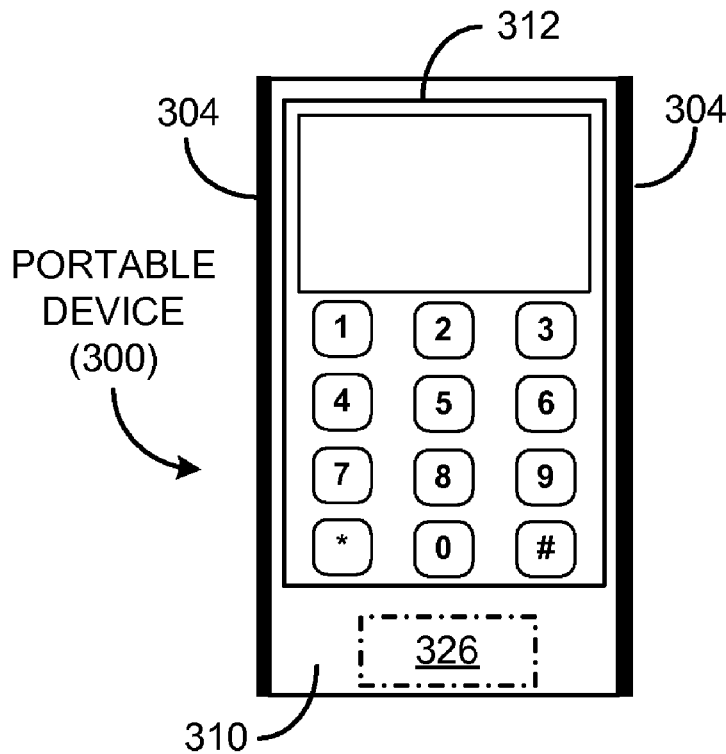
FIGS. 3A-3C are diagrams illustrating an exemplary portable device according to exemplary embodiments.

To describe in more detail the display-based host device 200 and the methods and computer program products for operating the display-based host device 200, reference will be made to FIGS. 2A, 2B, 3A and 4. FIG. 2A is a cross-sectional view along line A-A (FIG. 1) of an exemplary docking station 220 in the display-based host device 200 according to an exemplary embodiment, and FIG. 2B is the same cross-sectional view with a portable device 300 docked in the docking station 220 according to an exemplary embodiment. FIG. 3A is a diagram illustrating an exemplary portable device 300 according to one exemplary embodiment, and FIG. 4 is a flowchart illustrating a method for operating the display-based host device 200 according to an exemplary embodiment.

Figure 4:
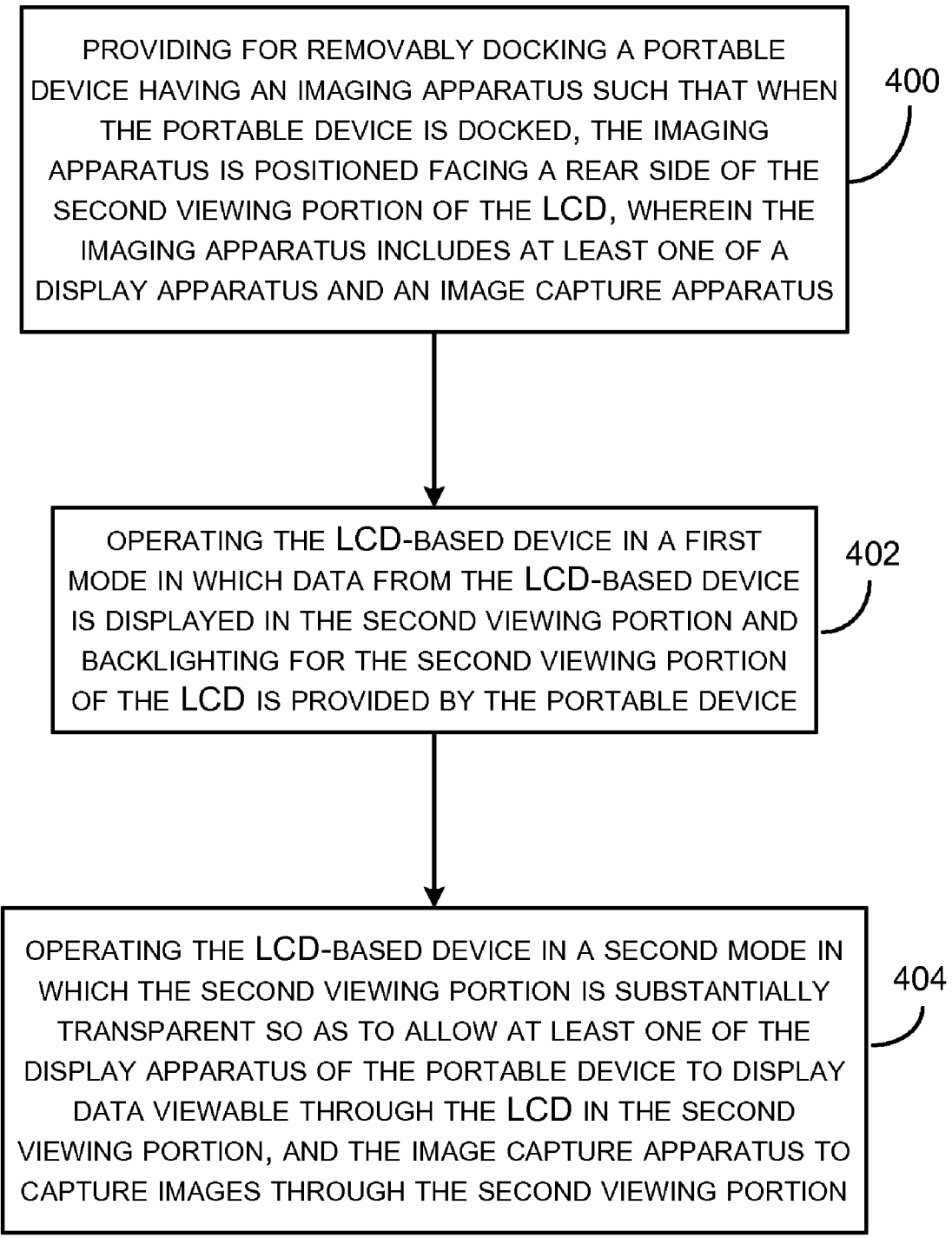
FIG. 4 is a flowchart illustrating a method for operating the display-based host device according to an exemplary embodiment.

Referring first to FIG. 4, the exemplary method for operating a display-based host device 200 comprising a display assembly 202 having a first viewing portion 210a and a second viewing portion 210b within the first viewing portion 210a begins by providing for removably docking a portable device 300 having an imaging apparatus 310 such that when the portable device 300 is docked, the imaging apparatus 310 is positioned facing a rear side of the second viewing portion 210b of the display assembly 202, wherein the imaging apparatus 310 includes at least one of a display apparatus 312 and an image capture apparatus 314 (block 400). According to one embodiment, the display-based host device 200 includes means for providing for removably docking the portable device 300. For example, the docking station component 220 can be configured for performing this function.

In one embodiment, the docking station component 220 is configured to facilitate a physical and a logical coupling of the portable device 300 with the host device 200. For example, in one embodiment, the docking station component 220 includes guide slots 222 (FIG. 2A) on each of two longitudinal sidewalls that are configured to receive corresponding guide rails 304 (FIG. 3A) on the two longitudinal side surfaces of the portable device 300. Accordingly, when the removable device 300 is inserted into the docking station component 220, the guide rails 304 can fit within the guide slots 222 facilitating a smooth vertically aligned ingress and egress of the portable device 300 from the docking station component 220.

According to an exemplary embodiment, the docking station component 220 includes a device removal assist assembly component 224, which is a spring loaded assembly, as shown in FIG. 2A and FIG. 2B. In an unloaded state, an upper surface of the spring-loaded assembly component 224 obscures an electrical connector component 226. When the portable device 300 is inserted and pushed downward into the docking station component 220, the bottom of the portable device 300 contacts the device removal assist assembly component 224 and begins compressing the spring-loaded assembly component 224.

As the spring-loaded assembly component 224 is compressed, the electrical connector component 226 is exposed in one embodiment through a slot in the upper surface of the spring-loaded assembly component 224. As the portable device 300 is pushed further into the docking station component 220, the electrical connector component 226 receives the portable device 300 via an electrical contact socket component 326 of the portable device 300.

In one embodiment, once the device removal assist assembly component 224 is compressed, it locks into position while the portable device 300 is inserted into the docking station component 220. When pressure is applied to the top of the portable device 300 and transmitted to the device removal assist assembly component 224, the assembly component 224 is disengaged and the spring tension of the springs 225 push the portable device 300 upward until the assembly component 224 returns to its unloaded state. As the assembly component 224 expands, the logical connections between the electrical connector component 226 and the electrical contact socket component 326 are disengaged. The portable device 300 can be grasped by the user and pulled upward to be removed completely from the docking station component 220.

In one embodiment, when the electrical connector component 226 is coupled to the electrical contact socket component 326, power can be supplied through the connection so the host device 200 can power and/or recharge the portable device 300. Moreover, the host device 200 can, in one embodiment, send information to and receive information from the portable device 300 when the portable device 300 is docked in the docking station component 220.

In another embodiment, the functionality of the electrical connector component 226 can be simplified to supply only power connections. In this embodiment, information can be sent to and received from the portable device 300 via a wireless communication component (not shown) of the host device 200. The wireless communication component can enable communication between the portable device 300 and the host device 200 via any common wireless communication technology utilizing radio frequency, microwave, infrared light, laser light, and the like. To enhance security, the wireless communication component can be configured for encrypting the information sent from the host device 200 to the portable device 300. In this embodiment, existing wireless hardware and connections between the host 200 and portable 300 devices can be utilized while simplifying the implementation of the electrical connector component 226.

In another embodiment, the electrical connector component 226 comprises a symmetric pin and signal configuration that allows the portable device to be placed in a first position with the imaging apparatus 310 oriented toward the display assembly 202, or in a second position with the imaging apparatus 310 oriented away from display assembly 202. For example, the electrical connector component 226 and the electrical contact socket component 326 can have a symmetric electrical connection pattern, with complimentary electrical connections on both sides of the connector. This configuration would allow the portable device 300 to be inserted with the imaging apparatus 310 oriented away from the display assembly 202, thereby allowing the imaging apparatus 310 to be viewable when the display assembly 202 is closed and not viewable.

Referring again to FIG. 4, when the portable device 300 is docked to the display-based host device 200 via the docking station component 220, the method continues by operating the display-based host device 200 in a first mode in which data from the display-based host device 200 is displayed in the second viewing portion 210b and backlighting for the second viewing portion 210b of the display assembly 202 is provided by the portable device 300 (block 402). In the first mode of operation, the display apparatus 312 of the imaging apparatus 310 is used as a backlighting source for the second viewing portion 210b of the display assembly 202. According to one embodiment, the display-based host device 200 includes means for operating in the first mode. For example, a display mode processor component can be configured for performing this function.

Figure 5:
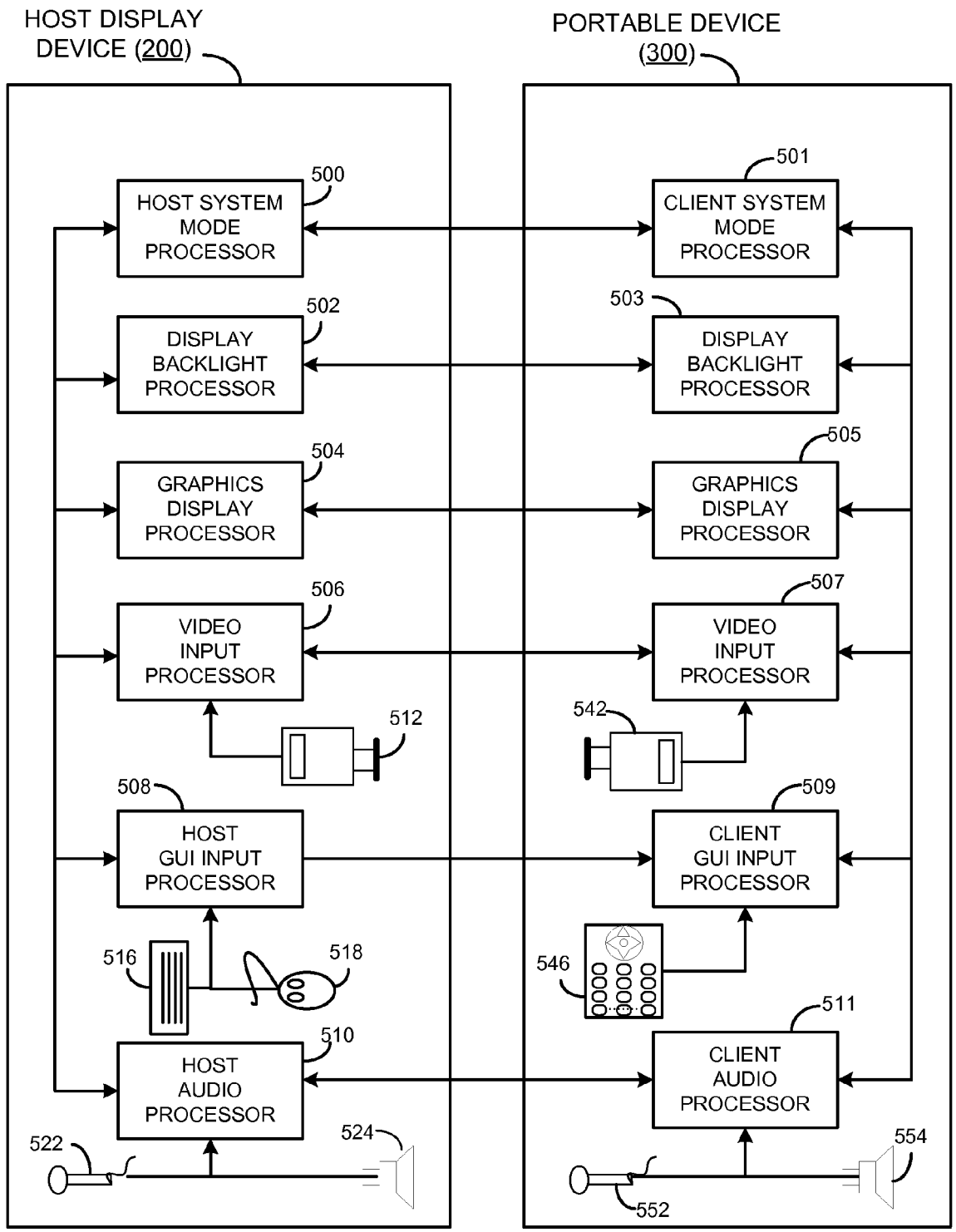
FIG. 5 is a component block diagram illustrating an exemplary display-based host device and an exemplary portable device according to an exemplary embodiment.

FIG. 5 is a component block diagram illustrating an exemplary display-based host device 200 and an exemplary portable device 300 according to an exemplary embodiment. When the portable device 300 is docked in the docking station component 220, the portable device 300 is physically and logically connected to the host device 200 via the electrical contact socket component 326 and the electrical connector component 226. In one embodiment, when the connection is established, the electrical connector component 226 can be configured to generate and send a dock connect signal to the display mode processor component 500 in the host device 200. In response to receiving the dock connect signal, the display mode processor component 500 can query a corresponding client system mode processor component 501 in the portable device 300 to determine the display, input, backlight, and camera capabilities of the device 300.

Based on the capabilities for this mode of backlighting, the display mode processor component 500 can, in one embodiment, send a command to the client system mode processor component 501 to clear the display apparatus 312 of any user interface controls and/or ornaments. An illuminate command can also be sent to the client system mode processor component 501 to display white color pixels across the display apparatus 312, and to turn on the portable device's backlight panel.

Figure 3B:
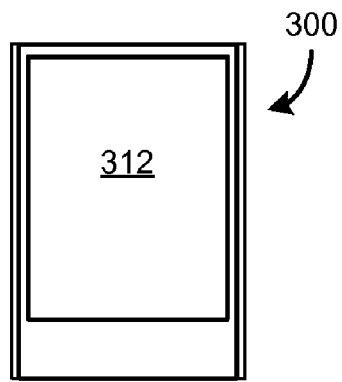

In response to receiving the clear command and the illuminate command, the client system mode processor component 501 can, in one embodiment, send commands to a graphics display processor component 505 to fill the display apparatus 312 with white pixels, and can send the illuminate command to a display backlight processor component 503 to illuminate the display apparatus 312 of the portable device 300. For example, when the portable device 300 operates in this mode, a phone user interface, shown in FIG. 3A, can be replaced with white pixels and a white background can be Illuminated by the portable device's backlight panel, as shown in FIG. 3B.

Figure 6A:
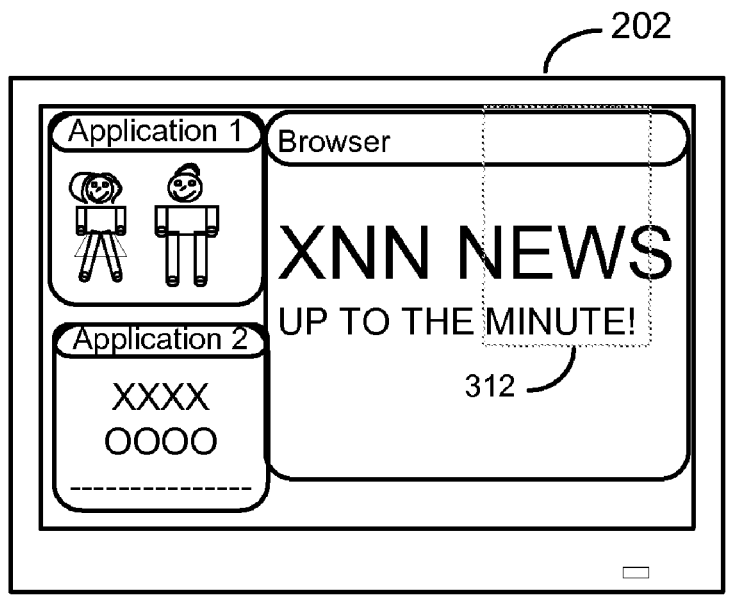
FIGS. 6A and 6B illustrate content displayed in the display assembly of the host device according to one exemplary embodiment.

According to an exemplary embodiment, when the portable device 300 is docked in the host device 200 and when the host device 200 is operating in the first mode, the display apparatus 312 of the portable device 300 can emit white diffused light in a forward direction that illuminates the second viewing portion 210b of the display assembly 202. This, in turn, illuminates any information displayed in the first and second viewing portions 210a, 210b of the display assembly 202, shown in FIG. 6A.

In one embodiment, the color and intensity of the backlighting provided by the display apparatus 312 of the portable device 300 can change to indicate, for example, a status of the portable device 300 and/or the host device 200. In this embodiment, the addressable pixels of the display apparatus 312 can display a range of colors and these colors can be used to provide display emphasis on the display assembly 202 of the host device 200. For instance, the backlight illumination of the display apparatus 312 can be switched on and off in a timed, repeating sequence to create a flashing effect so that the display assembly 202 appears to illuminate and dim for each cycle of illumination and illumination turned off. In another example, the intensity of the color of the light emitted from the display apparatus 312 can be varied to create a highlighting effect. This effect can be used for constant color emphasis, e.g., illuminating the area with red light or green light, or flashing emphasis, e.g., alternating the color between white and red. Combinations of these effects, along with the data displayed by the host device 200 can provide numerous new and highly interactive displays.

Referring again to FIG. 4, the exemplary method also includes operating the displayed-based host device 200 in a second mode in which the second viewing portion 210b is substantially transparent so as to allow at least one of the display apparatus 312 of the portable device 300 to display data viewable through the display assembly 202 in the second viewing portion 210b, and the image capture apparatus 314 to capture images through the second viewing portion 210b (block 504). According to one embodiment, the display-based host device 200 includes means for operating in the second mode. For example, the display mode processor component can be configured for performing this function.

Figure 3C:
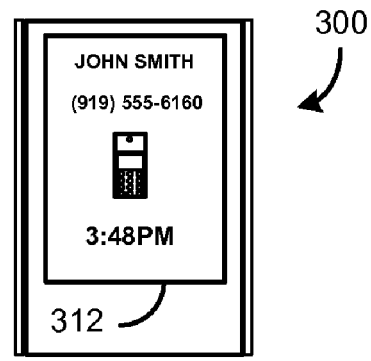

According to an exemplary embodiment, the second mode of operation can enable a display sub-mode that provides an alternative display of content on the display apparatus 312 of the imaging apparatus 310 and/or enable an image capture sub-mode that supports image capture by the image capture apparatus 314 of the imaging apparatus 310. Referring first to the display sub-mode, the portable device 300 can independently generate content for display on the display apparatus 312 of the imaging apparatus 310. For example, in FIG. 3C, when the portable device 300, which in this example is a mobile phone, has received a phone call, content generated by the portable device 300, can be displayed on the display apparatus 312. In the second mode, the second viewing portion 210b becomes transparent so that when the portable device 300 is docked, the display of illuminated content from the portable device 300 shows through the second viewing portion 210b of the display assembly 202, shown in FIG. 6B.

Figure 6B:
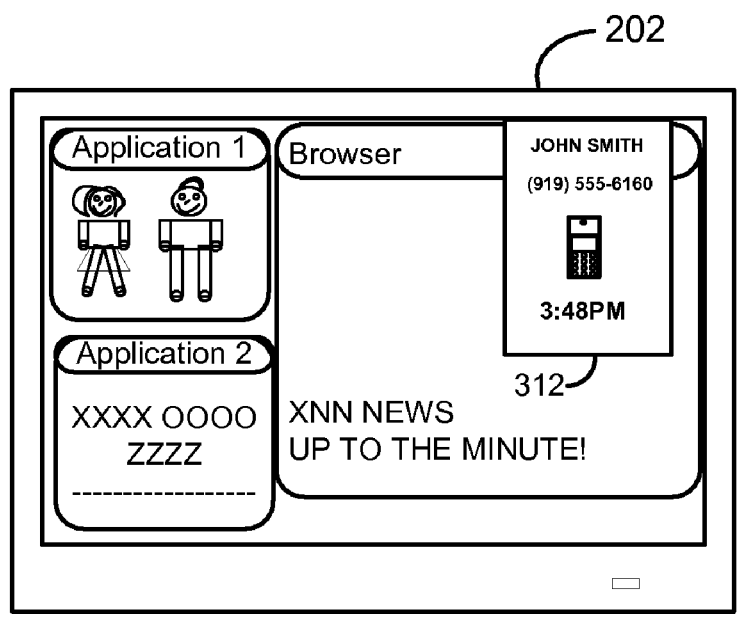

According to one embodiment, the second mode of operation can be implemented when the portable device 300 desires content to be displayed. The client system mode processor component 501 can, in one embodiment, send a command to the display mode processor component 500 to enable the portable device generated content to be displayed. The graphics display processor component 507 of the portable device 300 can be loaded with the generated content, while the display mode processor component 500 sends a command to the host's graphics display processor component 504 to disable, i.e., make transparent, the second viewing portion 210b of the display assembly 202. When the second viewing portion 210b is disabled it becomes transparent, and the content displayed on the display apparatus 312 of the portable device 300 and backlight show through as depicted in FIG. 6B.

In another embodiment, the host device 200 and the portable device 300 cooperatively generate content for display both on the display apparatus 312 of the imaging apparatus 310 and on the host device's display assembly 202. While the resulting display can be similar to the composite display shown in FIG. 6B, the host device's display assembly 202 remains enabled, with only portions of the display transparent. Accordingly, in this embodiment, a composite picture can be formed from content displayed on the host display and content displayed on the portable device 300, and each individual pixel of the display assembly 202 may be on and displaying a color, or off.

To implement this embodiment, the display mode processor component 500 can, in one embodiment, indicate to the client system mode processor component 501 that cooperative content is to be displayed. In response, the client system mode processor component 501 can send an enable command to enable the portable device's graphics display processor component 505 to accept content from the host device's graphics display processor component 504. The host device's graphics display processor component 504 can send content to the portable device's graphics display processor component 505 and the received content can be displayed on the portable device's display apparatus 312. The result is a composite display consisting of content from the host device 200, and content from the portable device 300 being displayed together in a composite manner, and backlit with the backlight capabilities of the portable device 300.

In one embodiment, sensitive content can be presented partially on the display assembly 202 of the host device 200, and partially on the imaging apparatus 310 of the portable device 300. In this embodiment, sensitive content can be sent to either the host device's graphics display processor component 504 or to the portable device's graphics display processor component 505 with separate encryption keys, at different times, to raise the security and protection of the sensitive data.

According to an exemplary embodiment, while content from the portable device 300 is displayed through the second viewing portion 210b of the display assembly 202, the portable device 300 can receive user inputs relating to the displayed content via the host device 200. For example, content displayed on the display apparatus 312 can be a user interface having buttons and controls, such as those shown in FIG. 3A. A user of the host device 200 can provide input to these buttons and controls by using a pointing device, e.g., a mouse, to move a cursor to the desired buttons/controls displayed through the second viewing portion 210b and clicking on the button/control. Alternatively or additionally, the input can include touch input and human gesture input when the host device 200 supports this kind of input. In one embodiment, the host device 200 is configured to interpret the input event and to forward the input event to the portable device 300 for processing.

To implement this feature, any user input device including, but not limited to, a keyboard component 516 and a system pointing device 518, e.g., a mouse or a trackball component, can be coupled to a host user interface input processor 508 which, in one embodiment, is configured to monitoring for user inputs from the user input devices 516, 518. In one embodiment, the display mode processor component 500 can send commands to the client system mode processor component 501 to enable user inputs from the host device 200 and to enable the transmission of user inputs from the host device 200 to the portable device 300. In response, the client system mode processor component 501 sends the commands to a client user interface input processor component 509 so that the client GUI input processor component 509 can accept input from the host device 200.

When the host GUI input processor component 508 detects an input event from one of the input devices 516, 518, the input event can, in one embodiment, be forwarded to the portable device 300. In some cases the input event may require translation. For example, when the portable device 300 operates in a different code page, translation of a text input is required. In the case of a pointing device input event, the coordinates of the system pointer on the display assembly 202 may require translation into coordinates mapped to the portable device's display apparatus 312. This translation can be performed by the host GUI input processor component 508 or by the client GUI input processor component 509.

In one embodiment, the display of the system pointer can be constrained to the second viewing portion 210b that displays the portable device's user interface and all user inputs can be forwarded to the portable device 300. If a system pointing function is not supported on the portable device 300, a graphical representation of the portable device's user interface can be shown on the display assembly 202 as an alternative.

In another embodiment, the display mode processor component 500 can provide a clipboard interface to the portable device 300 so that clipboard data can be transferred between the host 200 and portable 300 devices. For example, the user can select content from the portable device 300 displayed in the second viewing portion 210b, or select content from the host device 200 displayed in the first viewing portion 210a, and perform a clipboard operation, such as copy, paste or cut, to transfer the selected content to the other device. For instance, when the selected content is generated by the portable device 300 and the clipboard operation is a cut, the selected data can be transferred by the portable device 300 to the host device 200, and the data can be deleted on the portable device 300, in accordance with the function of a cut operation on the portable device 300. In one embodiment, the display mode processor component 500 can be configured to determine whether a requested clipboard operation is authorized to prevent inappropriate transfer of data to or from the portable device 300.

In another embodiment, the display mode processor component 500 can be configured for providing for sharing visual content between the host device 200 and the portable device 300 such that a visual object in either the first viewing portion 210a or the second viewing portion 210b can be transferable to the second 210b or first 210a viewing portions, respectively. For example, the host graphics display processor component 504 and the portable device's graphics display processor component 505 can be configured to share content so that as an object is selected and dragged from the first viewing portion 210a to the second viewing portion 210b, the visual image of the object is transferred to the display apparatus 312 of the portable client 300, and vice versa. In one embodiment, the pointing device 518 coupled to the host device 200 can be used to select and drag visual objects displayed on the display assembly 202, and content can be transferred to and from the host device 200 from and to the portable device 300.

Figure 7A:
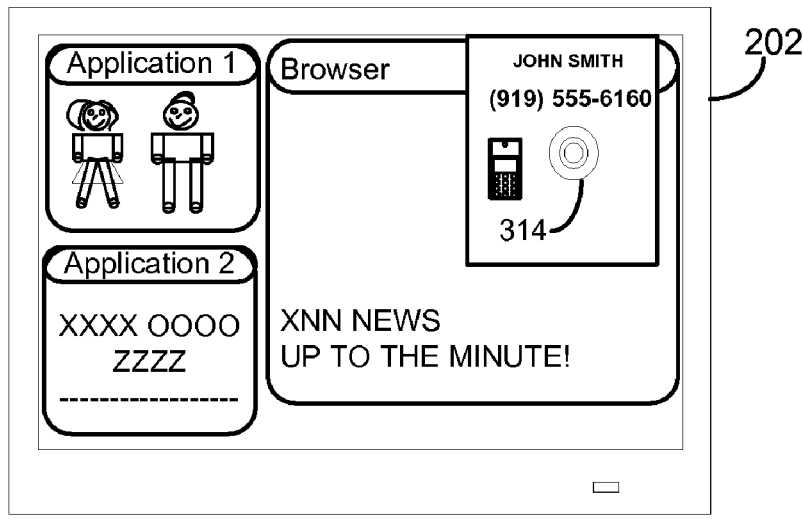
FIGS. 7A and 7B illustrate content displayed in the display assembly of a camera viewable through the display assembly according to another exemplary embodiment.
Figure 7B:
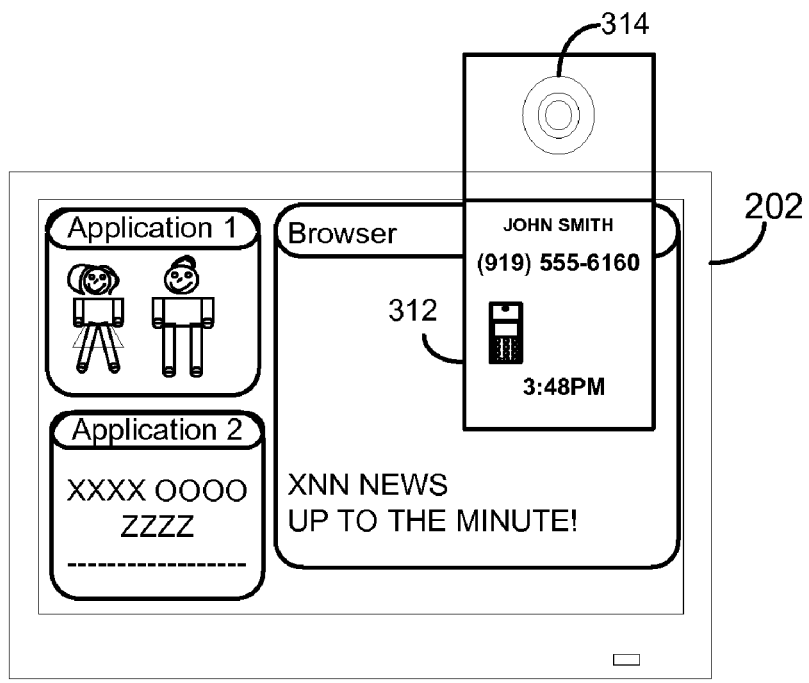

Referring now to the image capture sub-mode of the second mode of operation, in addition to support the display sub-mode features, the display mode processor component 500 is configured to support an image capture apparatus 314 of the portable device 300 for image capture, which can include photography and/or videography. In one embodiment, shown in FIG. 7A, the image capture apparatus 314 can be a camera that is integrated with the display apparatus 312. In another embodiment, shown in FIG. 7B, the camera 314 can extend above the display assembly 202.

In one embodiment, when the host device 200 desires image capture input from the portable device's camera 314, the display mode processor component 500 can send a command to the client system mode processor component 501 to enable image capture. In response, the client system mode processor component 501 sends a command signal to a video input processor component 507 to enable input of the camera 314 into the portable device 300. Once enabled, the client video input processor component 507 begins sending captured image signals to host device's video input processor component 506.

In addition, the display mode processor component 500 can send a command signal to the host device's video input processor component 506 to accept image signals from the client video input processor component 507. The display mode processor component 500 can also send a command signal to the host device's graphics display processor component 504 to disable the second viewing portion 210b of the display in front of the camera 314, which provides a transparent window through which the camera 314 can acquire images.

In another embodiment of the image capture sub-mode, the portable device 300, rather than the host device 200, desires image capture input from the portable device's camera 314. In this case, the client system mode processor component 501 can send a command signal to the display mode processor component 500 to enable image capture. In response, the display mode processor component 500 sends a command signal to the host device's graphics display processor component 504 to disable the second viewing portion 210b in front of the camera 314 thereby providing a transparent area through which the camera 314 can acquire images.

In addition to enabling the display and transfer of data between the host 200 and portable 300 devices and enabling image capture, the display mode processor component can enable other features of the host device 200 that can be utilized by the portable device 300. For example, in one embodiment, when the portable device 300 is docked, the portable device 300 can utilize audio components, e.g., a microphone and speakers, of the host device 200. In this case, the display mode processor component 500 can send an audio-enable command to the client system mode processor component 501, and an audio-share-enable command to the host audio processor component 510. Thereafter, the host audio processor component 510 can forward audio received from the host device's microphone component 522 to a client audio processor component 511. In addition, the host audio processor component 510 can accept audio received from the client audio processor component 511 and can output it through the audio output system of the host device 200 to the speaker component 524, or any other connected output device.

Through aspects of the embodiments described, a display-based host device 200 includes a docking station for physically and logically connecting the host device 200 to a portable device 300 having an imaging apparatus 310 that includes a display apparatus 312 for displaying content and for providing backlighting and/or an image capture apparatus 314 for capturing images. When the portable device 300 is docked to the host device 200, the display apparatus 312 provides backlighting for a portion of the host device's display directly in front of the imaging apparatus 310. In one operational mode, the portable device 300 displays no content and provides backlighting only. In another operational mode, the portable device 300 can display content and/or capture images through the portion of the host device's display.

It should be understood that the various components illustrated in the figures represent logical components that are configured to perform the functionality described herein and may be implemented in software, hardware, or a combination of the two. Moreover, some or all of these logical components may be combined and some may be omitted altogether while still achieving the functionality described herein.

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any medium that can contain, store, communicate, propagate, or transport instructions for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a portable digital video disc (DVD), a wired network connection and associated transmission medium, such as an ETHERNET transmission system, and/or a wireless network connection and associated transmission medium, such as an IEEE 802.11 (a), (b), or (g) or a BLUETOOTH transmission system, a wide-area network (WAN), a local-area network (LAN), the Internet, and/or an intranet.

Thus, the subject matter described herein can be embodied in many different forms, and all such forms are contemplated to be within the scope of what is claimed.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A display-based host device comprising:
    a display assembly including a first viewing portion and a second viewing portion within the first viewing portion;
    a docking station configured for removably docking a portable device having an imaging apparatus such that the imaging apparatus is positioned facing a rear side of the second viewing portion of the display assembly, wherein the imaging apparatus includes at least one of a display apparatus and an image capture apparatus; and
    a display mode processor component configured for operating the display-based host device in a first mode in which data from the display-based host device is displayed in the second viewing portion and backlighting for the second viewing portion of the display assembly is provided by the portable device, and for operating the display-based host device in a second mode in which the second viewing portion is substantially transparent so as to allow at least one of the display apparatus of the portable device to display data viewable through the display assembly in the second viewing portion, and the image capture apparatus to capture images through the second viewing portion.

2. The display-based host device of claim 1 wherein the docking station includes a connector component that is configured to receive the portable device and to allow the host device to at least one of power the portable device and to send information to and receive information from the portable device when the portable device is docked in the docking station.

3. The display-based host device of claim 2 wherein the connector component comprises a symmetric pin and signal configuration that allows the portable device to be placed in one of a first position with the imaging apparatus oriented toward the display assembly and a second position with the imaging apparatus oriented away from the display assembly such that the imaging apparatus of the portable device is viewable.

4. The display-based host device of claim 1 further comprising:
    a power connector component configured to at least one of power and recharge the portable device when the portable device is removably docked in the docking station; and
    a wireless communication component configured for wirelessly receiving information from and sending information to the portable device.

5. The display-based host device of claim 4 wherein the wireless communication component is configured for encrypting information sent from the host device to the portable device.

6. The display-based host device of claim 1 wherein the portable device is configured for changing at least one of a color and an intensity of the backlighting provided by the portable device.

7. The display-based host device of claim 1 wherein the portable device is configured for changing at least one of a color and an intensity of the backlighting provided by the portable device to indicate a status of at least one of the portable device and the host device.

8. The display-based host device of claim 1 further including a user input device coupled to a user interface component and wherein when the display-based host device is operating in the second mode, the display mode processor component is configured for providing for transmitting user input commands received by the user interface component via the user input device to the portable device.

9. The display-based host device of claim 1 further including a user input device coupled to a user interface component and wherein when the host device is operating in the second mode and data from the portable device is viewed through the second viewing portion of the display assembly, the display mode processor component is configured for providing for performing a clipboard operation on selected data from at least one of the portable device and the host device.

10. The display-based host device of claim 9 wherein prior to executing the clipboard operation, the display mode processor component is configured for providing for authorizing the clipboard operation.

11. The display-based host device of claim 1 further including a user input device coupled to a user interface component and wherein when the host device is operating in the second mode and data from the portable device is viewed through the second viewing portion of the display assembly, the display mode processor component is configured for providing for sharing visual content between the host device and the portable device such that a visual object in one of the display assembly and the display apparatus is transferable to one of the display apparatus and the display assembly, respectively.

12. A method for operating a display-based host device comprising a display assembly having a first viewing portion and a second viewing portion within the first viewing portion, the method comprising:

provapping for removably docking a portable device to the display-based host device, the portable device having an imaging apparatus such that when the portable device is docked, the imaging apparatus is positioned facing a rear side of the second viewing portion of the display assembly, wherein the imaging apparatus includes at least one of a display apparatus and an image capture apparatus;

operating the display-based host device in a first mode in which data from the display-based host device is displayed in the second viewing portion and backlighting for the second viewing portion of the display assembly is provided by the portable device; and operating the display-based host device in a second mode in which the second viewing portion is substantially transparent so as to allow at least one of the display apparatus of the portable device to display data viewable through the display assembly in the second viewing portion, and the image capture apparatus to capture images through the second viewing portion.

13. The method of claim 12 further including providing for allowing the display-based host device to at least one of power the portable device and to send information to and receive information from the portable device when the portable device is docked.

14. The method of claim 12 further including providing for allowing the portable device to be placed in one of a first position with the imaging apparatus oriented toward the display assembly and a second position with the imaging apparatus oriented away from the display assembly such that the imaging apparatus of the portable device is viewable.

15. The method of claim 12 further comprising:

powering and recharging the portable device when the portable device is docked; and wirelessly receiving information from and sending information to the portable device.

16. The method of claim 15 wherein prior to sending information to the portable device, the method includes encrypting the information to be sent.

17. The method of claim 12 further comprising changing at least one of a color and an intensity of the backlighting provided by the portable device.

18. The method of claim 12 further comprising changing at least one of a color and an intensity of the backlighting provided by the portable device to indicate a status of at least one of the portable device and the display-based device.

19. The method of claim 12 wherein operating the display-based device in the second mode further includes providing for transmitting user input commands received by the user interface component of the display-based device to the portable device.

20. The method of claim 12 wherein operating the display-based device in the second mode further includes providing for performing a clipboard operation on selected data from at least one of the portable device and the display-based device.

21. The method of claim 20 wherein prior to executing the clipboard operation, the method includes providing for authorizing the clipboard operation.

22. The method of claim 12 wherein operating the display-based device in the second mode further includes providing for sharing visual content between the display-based device and the portable device such that a visual object in one of the display assembly and the display apparatus is transferable to one of the display apparatus and the display assembly, respectively.

23. A display-based host device comprising:

a display assembly having a first viewing portion and a second viewing portion within the first viewing portion;

means for removably docking a portable device having an imaging apparatus such that the imaging apparatus is positioned facing a rear side of the second viewing portion of the display assembly, wherein the imaging apparatus includes at least one of a display apparatus and an image capture apparatus; and means for operating the display-based device in a first mode in which data from the display-based device is displayed in the second viewing portion and backlighting for the second viewing portion of the display assembly is provided by the portable device, and for operating the display-based device in a second mode in which the second viewing portion is substantially transparent so as to allow at least one of the display apparatus of the portable device to display data viewable through the display assembly in the second viewing portion, and the image capture apparatus to capture images through the second viewing portion.

24. A computer readable recording medium tangibly embodying a computer program, executable by a machine, for operating a display-based host device when a portable device having an imaging apparatus is removably docked to the display-based device, wherein a display assembly of the host device includes a first viewing portion and a second viewing portion within the first viewing portion and when the portable device is docked, the imaging apparatus is positioned facing a rear side of the second viewing portion of the display assembly, and wherein the imaging apparatus includes at least one of a display apparatus and an image capture apparatus, the computer program including executable instructions for: operating the display-based host device in a first mode in which data from the host device is displayed in the second viewing portion and backlighting for the second viewing portion of the display assembly is provided by the portable device; and operating the host device in a second mode in which the second viewing portion is substantially transparent so as to allow at least one of the display apparatus of the portable device to display data viewable through the display assembly in the second viewing portion, and the image capture apparatus to capture images through the second viewing portion.

* * * * *